United States Patent
Gaviria Velez et al.

(10) Patent No.: US 10,455,093 B1
(45) Date of Patent: Oct. 22, 2019

(54) SYSTEM AND METHOD FOR UNIFIED CALL LOGS WITH SUPPORT FOR CALL CONTINUITY

(71) Applicant: Verizon Patent and Licensing Inc., Arlington, VA (US)

(72) Inventors: Rafael Andres Gaviria Velez, Andover, MA (US); Ashwin Swaminathan, Burlington, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 16/143,588

(22) Filed: Sep. 27, 2018

(51) Int. Cl.
| | |
|---|---|
| *H04W 36/18* | (2009.01) |
| *H04W 64/00* | (2009.01) |
| *H04M 3/58* | (2006.01) |
| *H04M 7/00* | (2006.01) |
| *H04M 3/22* | (2006.01) |
| *H04M 7/12* | (2006.01) |

(52) U.S. Cl.
CPC ........... *H04M 3/58* (2013.01); *H04M 3/2218* (2013.01); *H04M 7/006* (2013.01); *H04M 7/126* (2013.01); *H04W 36/18* (2013.01); *H04M 2203/4509* (2013.01)

(58) Field of Classification Search
CPC ........ H04M 3/58; H04M 7/006; H04M 7/126; H04M 2203/4509; H04M 3/2218; H04M 3/46; H04W 36/18
See application file for complete search history.

(56) References Cited

U.S. PATENT DOCUMENTS

| | | | | |
|---|---|---|---|---|
| 9,178,988 | B2 * | 11/2015 | Azim | H04M 3/2218 |
| 9,614,974 | B1 * | 4/2017 | Hodge | H04M 7/0078 |
| 9,912,821 | B1 * | 3/2018 | Hodge | H04M 15/705 |
| 10,148,814 | B2 * | 12/2018 | Giatilis | H04M 3/2218 |
| 2016/0269521 | A1 * | 9/2016 | Mendiratta | H04L 41/18 |
| 2017/0171384 | A1 * | 6/2017 | Ghuli | H04M 3/42059 |
| 2018/0049095 | A1 * | 2/2018 | Mishra | H04W 40/02 |
| 2018/0084389 | A1 * | 3/2018 | Snyder | H04W 4/021 |
| 2018/0139721 | A1 * | 5/2018 | Tamura | H04W 36/0022 |
| 2018/0278747 | A1 * | 9/2018 | Chiang | H04W 76/38 |
| 2019/0069185 | A1 * | 2/2019 | Sinha | H04W 16/18 |
| 2019/0096529 | A1 * | 3/2019 | Arffa | G16H 50/30 |
| 2019/0132757 | A1 * | 5/2019 | Tapia | H04W 24/02 |

\* cited by examiner

*Primary Examiner* — Khawar Iqbal (57) ABSTRACT

Systems and methods provide a unified call log for user devices in a device group. A user device receives an invite message for an incoming call and stores first call log information including a caller identifier based on the invite message. The user device receives a status message indicating that another user device has answered the incoming call and stores second call log information including a timestamp for the status message. The user device receives a call information message for a new line between the user device and a device associated with the caller telephone number, determines that the new line is a handover call associated with the incoming call, and stores third call log information for the new line. The user device determines that the handover call on the new line is ended and generates a call log entry including information from the incoming call and the handover call.

20 Claims, 10 Drawing Sheets

SYSTEM AND METHOD FOR UNIFIED CALL LOGS WITH SUPPORT FOR CALL CONTINUITY

BACKGROUND

Users often own multiple devices that are capable of receiving telephone calls (e.g., voice over Internet protocol ("VoIP") calls). For example, a particular user may own a smart phone, a wired phone, a tablet computer, a laptop computer, and a desktop computer, all of which may be capable of receiving VoIP calls. Some telephony service providers provide a feature that causes a group of phones associated with an account to ring at the same time when a call is placed to the user.

DETAILED DESCRIPTION OF PREFERRED EMBODIMENTS

The following detailed description refers to the accompanying drawings. The same reference numbers in different drawings may identify the same or similar elements.

Systems and methods described herein may allow for the generation of a unified call log, in order to enhance the user experience of users who use more than one device for making and receiving telephone calls. The system and methods allow user devices in a device group to each separately generate a unified call log in a distributed manner, without the need for a call log server. The systems and methods also allow user devices in the device group to detect intervening events during a call, such as call transfers and network handovers, and log the intervening events within a single call log entry.

Figure 1A:
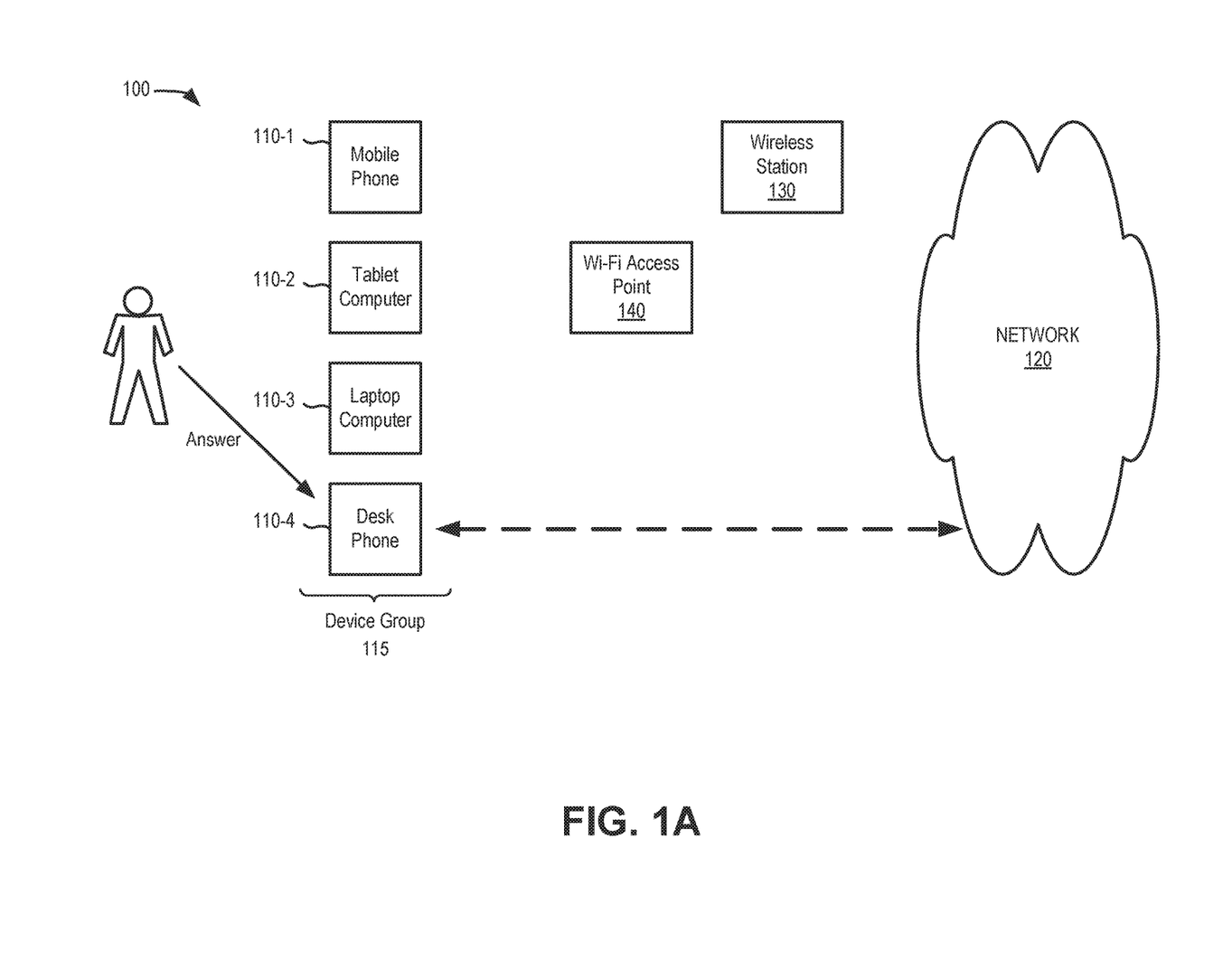
FIGS. 1A-1D are a diagrams illustrating concepts described herein.

FIGS. 1A-1D are diagrams illustrating concepts described herein. As shown in FIG. 1A, a user may be associated with several devices that are capable of receiving telephone calls, such as a mobile phone 110-1, a laptop computer 110-2, a tablet computer 110-3, and a desk telephone 110-4 (referred to collectively as "devices 110"). These multiple devices 110 may be associated as a device group 115 with a telephony service that simultaneously notifies (or rings) all devices 110 when an incoming call is delivered to an assigned telephone number for the group. For example, the user may have subscribed to a "one-call" or "blast" service provided by a telephony service provider. As shown in FIG. 1A, a call may be incoming for the user's device group 115, the illustrated devices 110 may simultaneously ring, and the user may answer the incoming call with one of devices 110. In the illustration of FIG. 1A, the user may choose to answer the call using desk telephone 110-4, which may have a wired network connection to a service provider network 120.

Figure 1B:
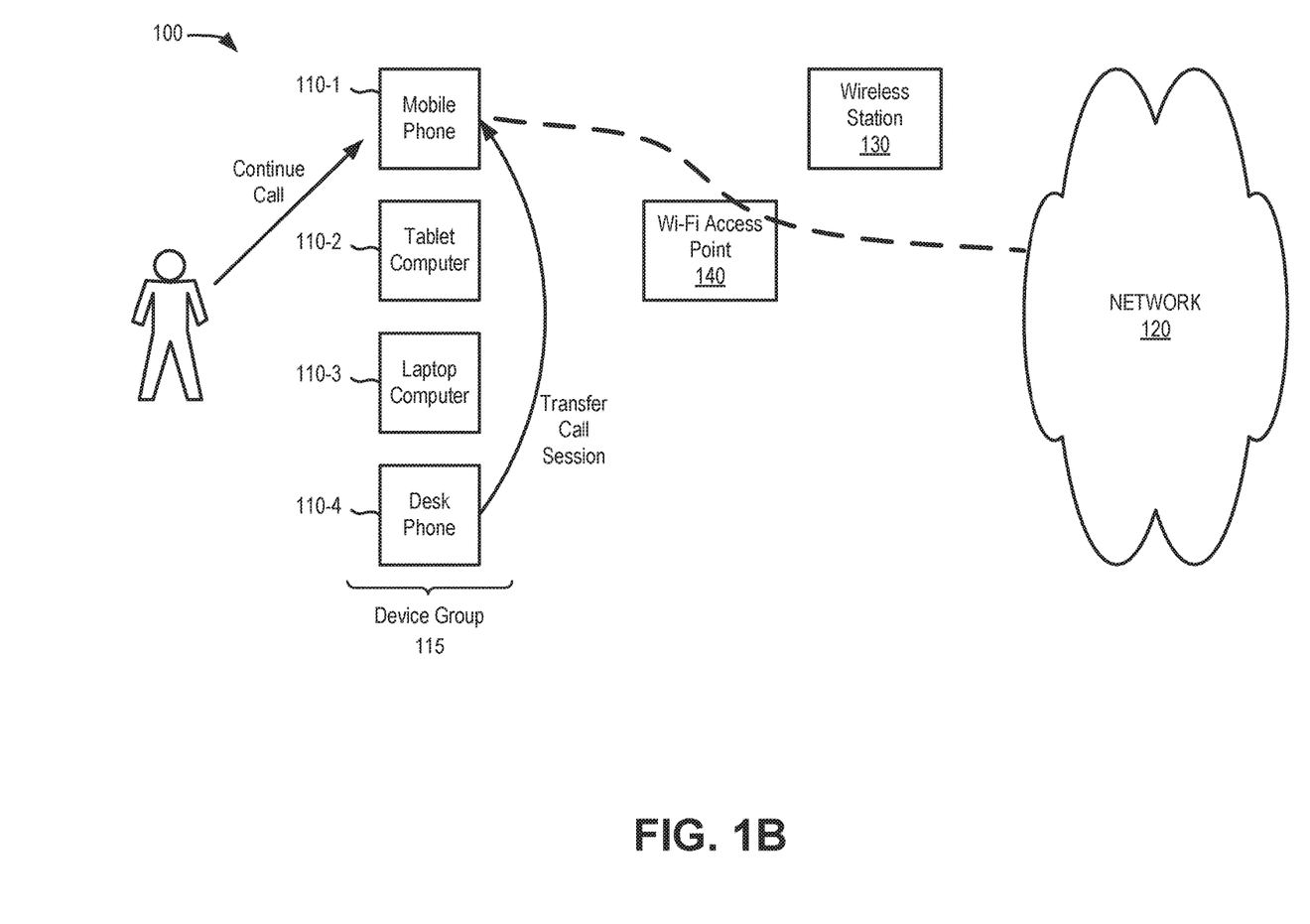

As shown in FIG. 1B, the user may transfer the answered call session from one device to another device, from the desk phone 110-4 to the mobile phone 110-1 during the life time of the call. At the time of the transfer, mobile phone 110-1 may be connected to network 120 via a Wi-Fi connection with a Wi-Fi access point 140. Continuing with the example scenario, the user may then leave his office and continue the same call with the mobile phone 110-1 while walking outside. Thus, as shown in FIG. 1C, mobile device 110-1 may participate in a network handover from access point 140 to a wireless station 130 that supports broadband cellular communications.

Figure 1C:
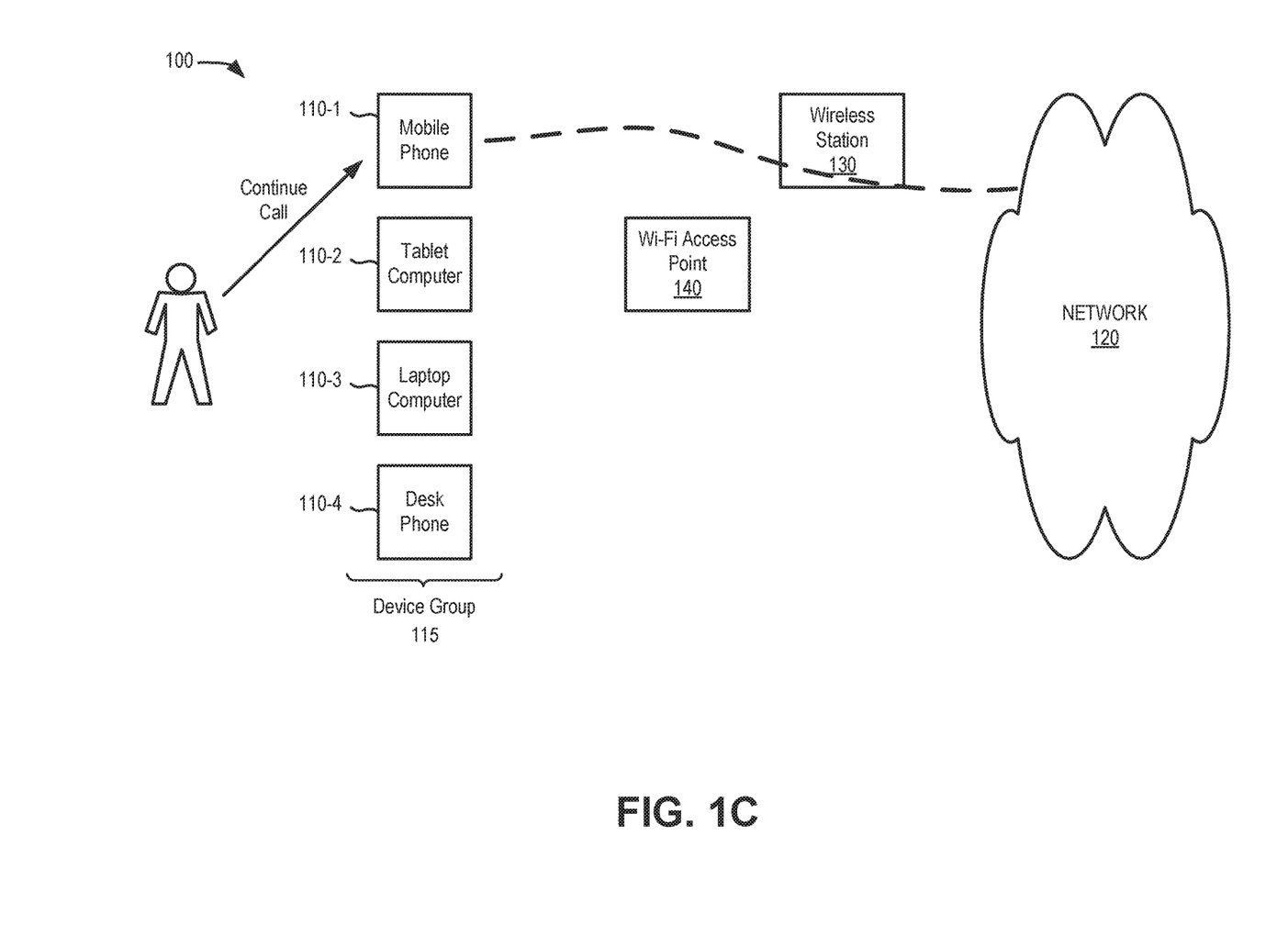

In some telephony networks, the call transfers and changing network connections described in relation to FIGS. 1A-1C may be logged by each individual device 110. For example, the initial call received at desk phone 110-4 in FIG. 1A would typically be logged as a missed call at devices 110-1, 110-2, and 110-3. Also, the call transfer to device 110-1 in FIG. 1B may not be recognized by devices 110-2 and 110-3. Furthermore, the handover from a LAN connection using access point 140 to a cellular connection using wireless station 130 in FIG. 1C would result in an indication of two separate calls—a different call for each type of network connection. Thus, the call logs of each device 110 may not be synchronized and individually would not provide a complete call history for an exchange, such as described above in relation to FIGS. 1A-1C.

Figure 1D:
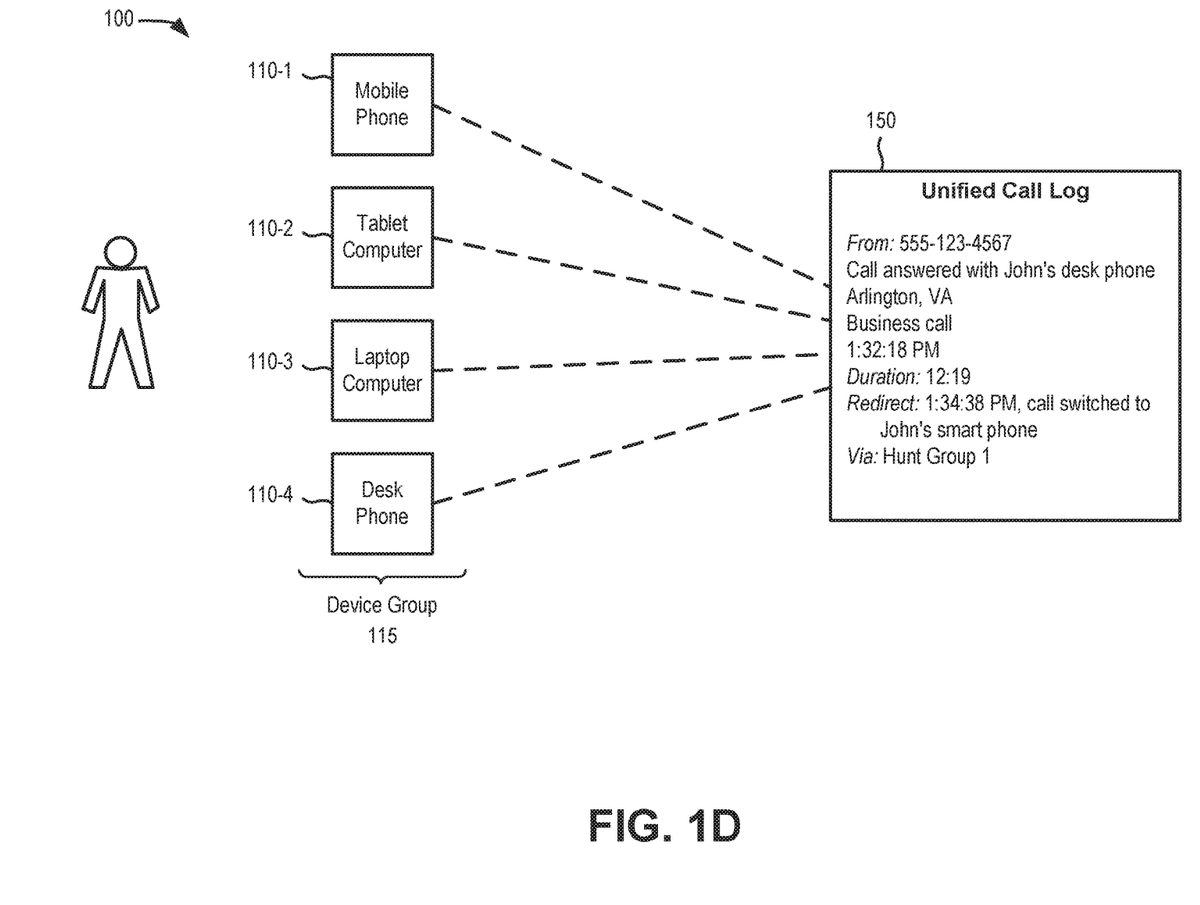

In accordance with implementations described herein, and as shown in FIG. 1D, all of the devices 110 in device group 115 may separately generate and store an entry 150 for a unified call log, indicating that the user answered the call using the desk phone 110-4 and provide the complete call record through the call's end at mobile phone 110-1. By storing unified call log entry 150, the user's experience may be enhanced, in that the user may have an accurate account of his or her telephone call records, regardless of the device and/or network connection used to answer calls. However, service provides may seek to avoid the cost and network complexity of adding dedicated network equipment to network 120 to generate a unified call log and communicate log information to each of devices 110. Thus, implementations described herein enable devices 110 in a device group to obtain and assemble call log information in a distributed manner to provide unified call log entry 150 for the device group (e.g., without relying on a dedicated call log server).

As shown in FIG. 1D, a unified call log entry 150 may include different fields, such as the telephone number from which the call was received ("555-123-4567"), an identification of a device that answered the call ("Call answered with John's desk phone"), information regarding the location at which the call originated ("Arlington, Va."), a tag associated with the call ("Business call"), a time at which the call was received ("1:32:18 PM"), a duration of the call ("12:19"), times at which the call was transferred and/or picked up by another device ("1:34:38 PM, call switched to John's smart phone"), and forwarding information ("Hunt Group 1"). As described further herein, the different fields in unified call log entry 150 may be compiled and derived separately by each user device 110 in device group 115.

Figure 2:
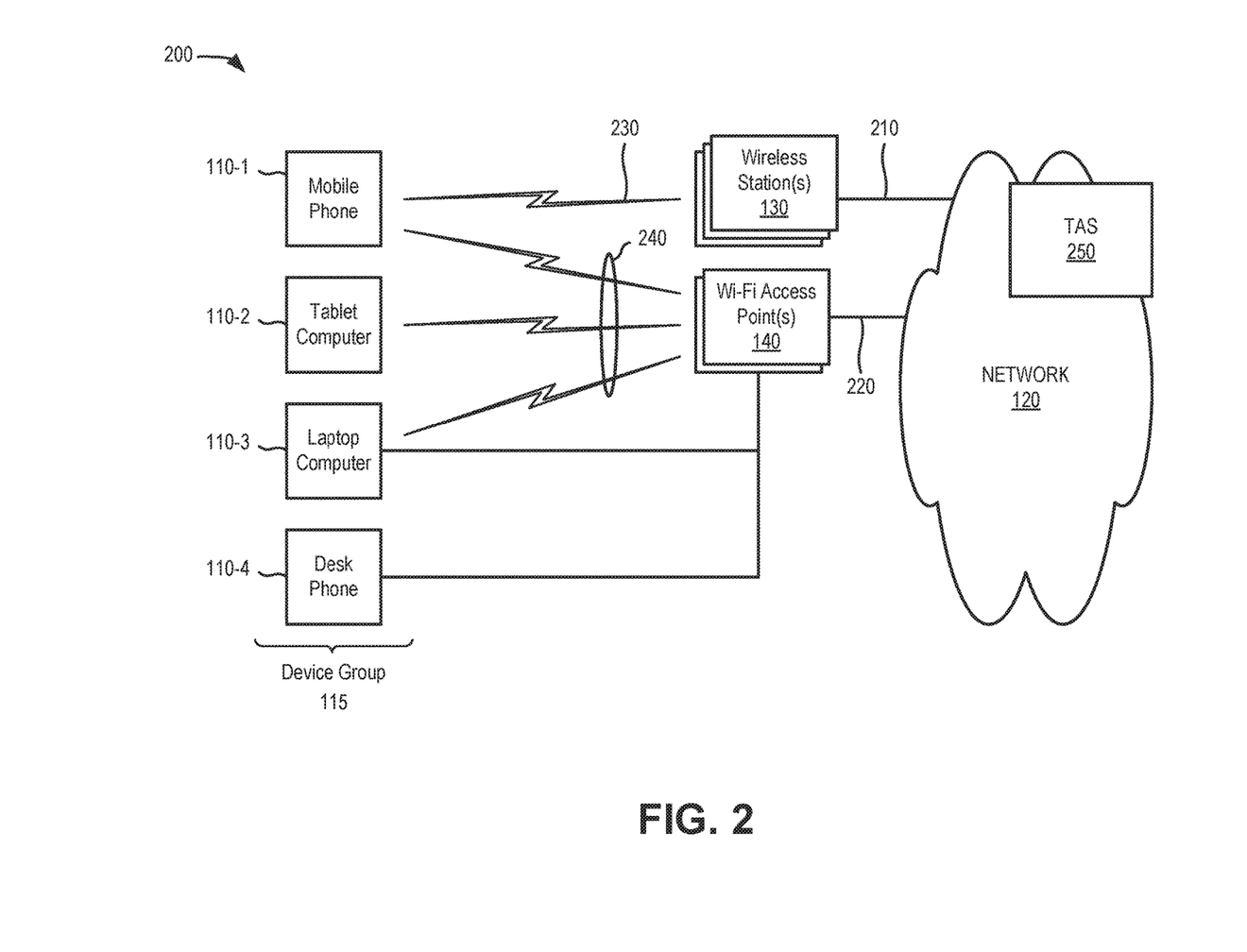
FIG. 2 is a diagram illustrating exemplary network environment in which systems and methods described herein may be implemented.

FIG. 2 illustrates an example environment 200, in which systems and/or methods described herein may be implemented. As shown in FIG. 2, environment 200 may include one or more devices 110, network 120, one or more wireless stations 130, one or more access points 140, a radio access network (RAN) 230, a wireless local area network (WLAN) 240, and telephony application server (TAS) device 250.

The quantity of devices and/or networks, illustrated in FIG. 2, is provided for explanatory purposes. In practice, environment 200 may include additional devices and/or networks, fewer devices and/or networks, different devices and/or networks, or differently arranged devices and/or networks than illustrated in FIG. 2. Alternatively, or additionally, one or more of the devices of environment 200 may perform one or more functions described as being performed by another one or more of the devices of environments 200. Devices of environment 200 may interconnect with each other and/or other devices via wired connections, wireless connections, or a combination of wired and wireless connections.

User device 110 may include a computing or communication device, such as a wireless mobile communication device that is capable of communicating with one or more networks (e.g., networks 120, 230, 240, etc.). For example, user device 110 may include a personal communications system ("PCS") terminal (e.g., a device that combines a cellular radiotelephone with data processing and data communications capabilities); a personal digital assistant ("PDA") (e.g., that can include a radiotelephone, a pager, Internet/intranet access, etc.); a radiotelephone; a smart phone; a laptop computer; a tablet computer; a set-top box ("STB"), a personal gaming system, a wearable computing device, a wired telephone, a Voice over Internet Protocol (VoIP) device, and/or another type of computing or communication device. In one implementation, user device 110 may include a mobile device that has the capability to communicate via multiple different network connections. For example, user device 110-1 may communicate via RAN 230 or WLAN 240.

According to one implementation, user device 110 may include a client application to enable user device 110 to participate with other user devices 110 in a device group. Device group 115 may provide telephony services allowing multiple devices to share a single number between devices 110 in device group 115 (e.g., different mobile and desktop phones) and take calls on different devices in device group 115.

Network 120 may include one or more networks, via which user device 110 and/or TAS device 250 may communicate. For example, network 120 may include one or more circuit-switched networks and/or packet-switched networks. Network 120 may include, for example, a local area network (LAN), a wide area network (WAN), a metropolitan area network (MAN), a Public Switched Telephone Network (PSTN), an ad hoc network, an intranet, the Internet, a fiber optic-based network, a wireless network, and/or a combination of these or other types of networks. Wireless stations 130 may connect to network 120 via backhaul links 210. According to one implementation, network 120 may include a core network for one or multiple RANs 230 described below. For example, network 120 may include the core part of an LTE network, an LTE-A network, a 5G New Radio network, etc. Depending on the implementation, network 120 may include various network elements, such as a gateway, a support node, a serving node, a router, a switch, a bridge, as well other network elements pertaining to various network-related functions, such as billing, security, authentication and authorization, network policies, subscriber profiles, etc.

Wireless station 130 may include a device that handles wireless transmissions to and from user device 110 and provides access to and from network 120. Wireless station 130 may include antennas and related transceiver circuitry for connecting to user device 110. For example, wireless station 130 may include a wireless access station, such as an eNodeB (e.g., an eNB for Third Generation Partnership Project (3GPP) LTE or 4G network standards), a next generation NodeB (e.g., a gNB for 3GPP 5G network standards), a Node B, a base transceiver station (BTS) in a Global System for Mobile Communications (GSM) system, a cell tower, etc. A collection of wireless stations 130 may form RAN 230 to provide user devices 110 with wireless (e.g., broadband cellular) access to network 210.

Access point 140 may provide local wired and wireless connections to user devices 110. WLAN 240 may operate to provide wireless access to a backhaul link 220 for an Internet service provider (ISP) associated, for example, with network 120. In one implementation, WLAN 240 may include multiple access points 140 and support the wireless connections to user devices 110, as well as corresponding ISP devices (e.g., optical or coaxial terminals, head end components, etc.) configured to provide Internet access or other types of network access to connected user devices 110.

TAS device 250 (also referred to herein as TAS 250) may include a network device, or a collection of computing devices, that store, process, and forward data. For example, TAS 250 may include a computer, a server, a cluster of servers, or another type of device capable of operating in a network environment. In some implementations, TAS 250 may include a back-to-back session initiation protocol (SIP) user agent capable of maintaining and notifying devices of call states. Additionally, or alternatively, TAS 250 may provide various telephony services that may not be directly related to routing network messages. For example, TAS 250 may provide telephony services, such as call waiting, call forwarding, call conferencing, or other types of services relating to communication sessions. In an IP Multimedia Subsystem (IMS) implementation using SIP for call set-up and tear-down, TAS 250 may be a server device in the IMS core that sends and receives SIP signaling messages amongst the client devices of the parties involved in or intended to participate in a voice or video call.

Figure 3:
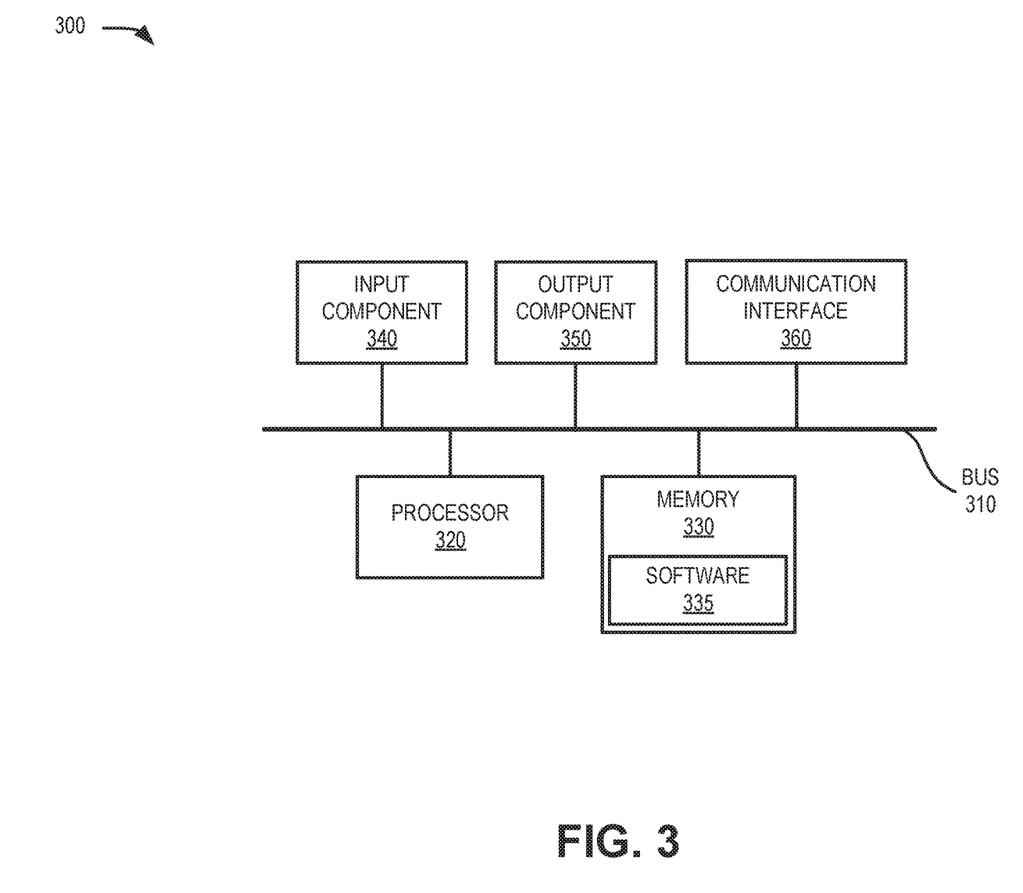
FIG. 3 is a diagram illustrating exemplary components of a device that may be included in the environment of FIG. 2.

FIG. 3 is a diagram illustrating exemplary components of a device 300. Device 300 may correspond, for example, to a component of user device 110, wireless station 130, access point 140, TAS 250 or another component of network environment 200. Device 300 may include a bus 310, a processor 320, a memory 330 with software 335, an input component 340, an output component 350, and a communication interface 360.

Bus 310 may include a path that permits communication among the components of device 300. Processor 320 may include a processor, a microprocessor, or processing logic that may interpret and execute instructions. Memory 330 may include any type of dynamic storage device that may store information and instructions, for execution by processor 320, and/or any type of non-volatile storage device that may store information for use by processor 320. According to one implementation, by way of example, memory 330 of user device 110 may include a database of stored contacts (e.g., including contact names, telephone numbers, tags, device types, etc.) that may be used to contribute to (or supplement) entries for unified call logs.

Software 335 includes an application or a program that provides a function and/or a process. Software 335 may also include firmware, middleware, microcode, hardware description language (HDL), and/or other form of instruction. By way of example, user device 110 may include software 335 (e.g., client application to communicate with TAS 250, etc.) to generate unified call logs and to perform other tasks as described herein.

Input component 340 may include a mechanism that permits a user to input information to device 300, such as a keyboard, a keypad, a button, a switch, etc. Output component 350 may include a mechanism that outputs information to the user, such as a display, a speaker, one or more light emitting diodes (LEDs), etc.

Communication interface 360 may include a transceiver that enables device 300 to communicate with other devices and/or systems via wireless communications, wired communications, or a combination of wireless and wired communications. For example, communication interface 360 may include mechanisms for communicating with another device or system via a network. Communication interface 360 may include an antenna assembly for transmission and/or reception of radio frequency (RF) signals. For example, communication interface 360 may include one or more antennas to transmit and/or receive RF signals over the air. Communication interface 360 may, for example, receive RF signals and transmit them over the air to user device 110/wireless station 140, and receive RF signals over the air from wireless station 130/user device 110. In one implementation, for example, communication interface 360 may communicate with a network and/or devices connected to a network. Alternatively or additionally, communication interface 360 may be a logical component that includes input and output ports, input and output systems, and/or other input and output components that facilitate the transmission of data to other devices.

Device 300 may perform certain operations in response to processor 320 executing software instructions (e.g., software 335) contained in a computer-readable medium, such as memory 330. A computer-readable medium may be defined as a non-transitory memory device. A memory device may be implemented within a single physical memory device or spread across multiple physical memory devices. The software instructions may be read into memory 330 from another computer-readable medium or from another device. The software instructions contained in memory 330 may cause processor 320 to perform processes described herein. Alternatively, hardwired circuitry may be used in place of or in combination with software instructions to implement processes described herein. Thus, implementations described herein are not limited to any specific combination of hardware circuitry and software.

Device 300 may include fewer components, additional components, different components, and/or differently arranged components than those illustrated in FIG. 3. As an example, in some implementations, a display may not be included in device 300. In these situations, device 300 may be a "headless" device that does not include input component 340. Additionally, or alternatively, one or more operations described as being performed by a particular component of device 300 may be performed by one or more other components, in addition to or instead of the particular component of device 300.

Figure 4:
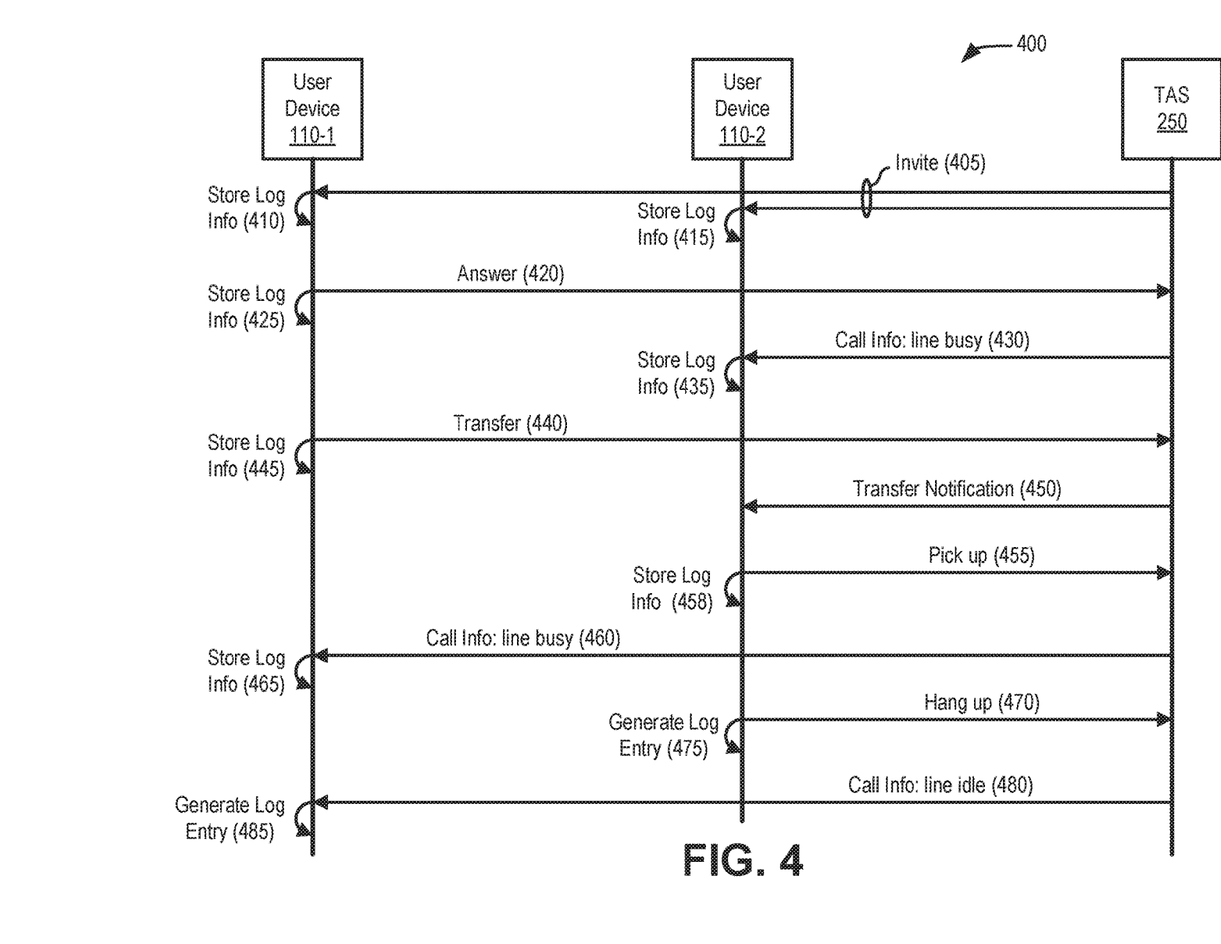
FIG. 4 is a diagram illustrating a communications for generating a unified call log for an incoming call to a device group, according to an implementation described herein.
Figure 5:
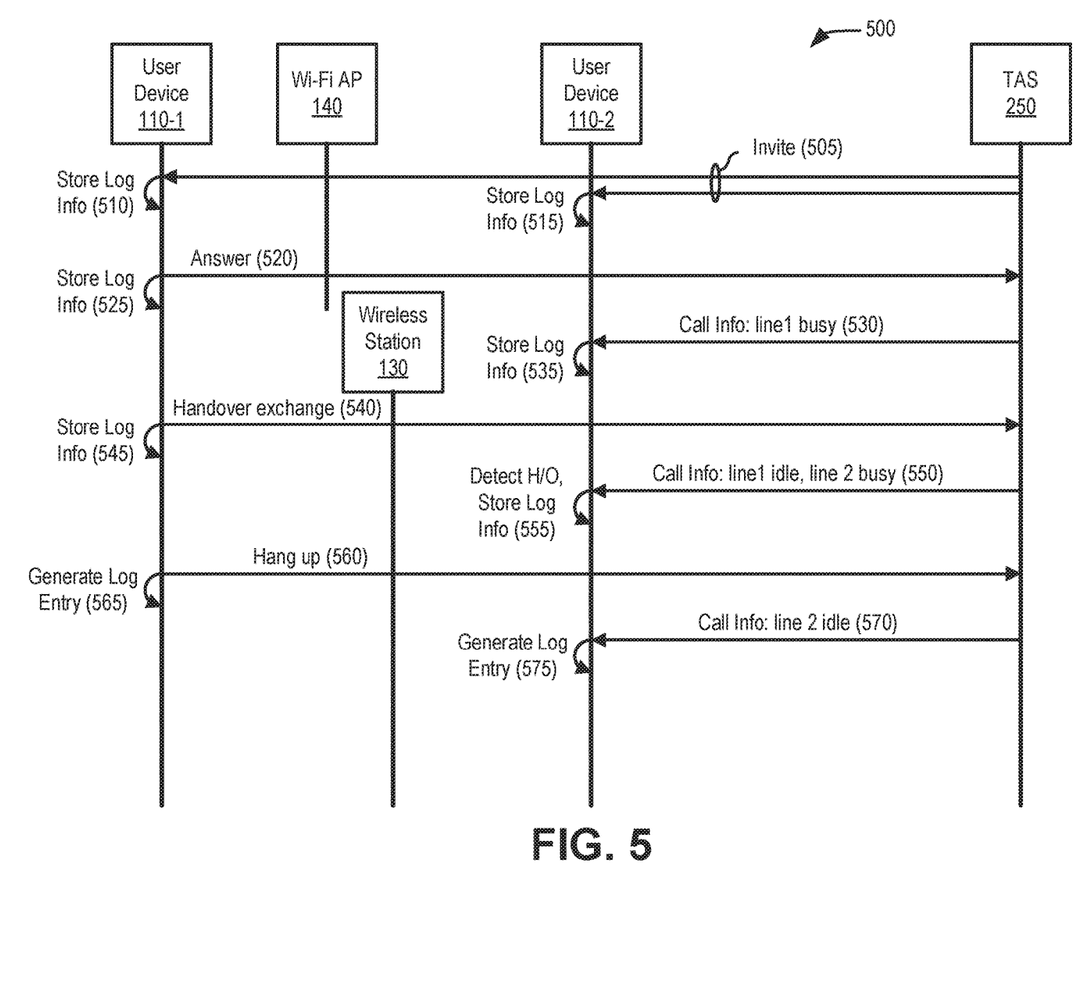
FIG. 5 is a diagram illustrating communications for generating a unified call log for an incoming call to a device group, according to another implementation described herein.

FIGS. 4 and 5 illustrate signals for generating a unified call log in a device group. More particularly, FIG. 4 illustrates example signals in a portion 400 of network environment 200 for generating a unified call log for a transferred call. FIG. 5 illustrates example signals in a portion 500 of network environment 200 for generating a unified call log for a handover call. In some implementations, the various signals shown in these figures may include signals according to SIP, Signaling System 7 ("SS7"), and/or another protocol. Thus, while the general functionality of the signals is described in these figures, in practice, additional, different, or fewer signals may be used. For example, in practice, the actual signals implemented may have different names than the signals illustrated in the figures. As another example, signals illustrated by one arrow in these figures (e.g., answer 420, and hang up 465) may represent multiple signals, potentially including well-known sets of signals, to accomplish the functionality conceptually illustrated in these figures. For instance, "answer" signals, shown in these figures, may represent multiple signals being sent by or on behalf of respective devices, such as several SIP signals (e.g., SIP ACK ("acknowledgment") signals, etc.). Further, FIGS. 4 and 5 are illustrated in the context of a set of two user devices 110-1 and 110-2. In practice, similar techniques may be performed for groups of more than two (e.g., three, four, ten, etc.) user devices 110.

Referring to FIG. 4, TAS 250 may output (at 405) an "Invite" signal to user devices 110-1 and 110-2. Assume, for example, that user devices 110-1 and 110-2 are associated with a "one call" feature, whereby both user devices 110-1 and 110-2 may answer calls to a particular telephone number or subscriber. Invite signal 405 may indicate an incoming call for the telephone number or subscriber. Invite signal 405 may include a telephone number (or another unique identifier) of the calling party. In one implementation, the caller's telephone number may be included within a SIP URI. Invite signal 405 may also include a history section, which may indicate if an incoming call was redirected. As mentioned above, in situations where more than two user devices 110 are associated with the telephone number or device group, invite signal 405 may be provided to the additional user devices 110 as well.

Regardless of whether invite signal 405 results in an answer by one of user devices 110, each of user devices 110-1 and 110-2 may store log information obtained and/or derived from invite signal 405. For example, when invite 405 is received at user device 110-1, the client application running on user device 110-1 may detect the caller's telephone number. For example, in one implementation, user device 110-1 may parse a P-Asserted-Identity header in a SIP INVITE message and identify the user part of the SIP URI that contains the telephone number that will be used in the display and the call log of user device 110-1. User device 110-1 may attempt to match this telephone number with numbers stored in a locally-stored contacts database (e.g., in memory 330). If there is a match, user device 110-1 may extract a user name from the matched contact (and, optionally, other information such as a caller's telephone type (e.g., work, home, etc.)) as call information. If there is no match, user device 110-1 may parse a Display Name from the SIP URI and use that as the user name. User device 110-1 may store the caller's user name and telephone number as part of log information 410.

In some implementations, invite signal 405 may also include a History-Info header that may indicate if an incoming call was redirected or forwarded. When user device 110 receives invite message 405 it may use the History-Info header as follows. If the History-Info header is not present, then no redirection info will be displayed/stored. If the History-Info header is present and has only one entry then user device 110 confirms a redirected call by comparing the user part of the URI received in the History-Info header with the user part of the Request-URI header in invite message 405. If the URIs match, then no forwarding information needs to be displayed. If the URIs do not match, then the information in the single History-Info header entry may be displayed/stored as the forwarding information (e.g., for call log entry 150). If the History-Info header is present and has multiple entries then user device 110 may make sure to pick the correct entry by looking at the index parameter of the invite message. The index may include a series of integers separated by dots (e.g., "1.1.2"). Each dot reflects a forwarding hop. The highest integer at each hop reflects the number of entities/devices to which the call request has been retargeted. User device 110 may find the index with the maximum number of hops (based on the dots) and compare the URI in that entry with the Request-URI header. If these URIs match, user device 110 may work up the index tree until it finds a different URI entry. Once a different URI is found, user device 110 may use that URI as the forwarding information. If the URIs do not match, user device 110 may not display/store any forwarding information.

User device 110-2 may perform a similar parsing of invite 405 and store log information 415. Log information 410 and 415 may be identical or may vary slightly depending on (a) whether the respective locally-stored contacts databases in user device 110-1 and user device 110-2 are synchronized and (b) nominal differences between timestamps for answer signal 420 and/or line busy signal 430.

Assume that user device 110-1 is used to answer the call. For example, a user may choose to answer the call, or "pick up," using user device 110-1. Based on answering the call, user device 110-1 may output an answer signal 420, indicating that the call has been answered by user device 110-1. In some implementations, answer signal 420 may be a well-known signal, such as a SIP 200 OK message. In other implementations, answer signal 420 may include information not commonly included in an answer signal, such as a nickname of user device 110-1, coordinates of a geographic location of user device 110-1, and/or other information.

In conjunction with answer signal 420, user device 110-1 may store log information 425, which may include a timestamp of when user device 110-1 answered the call.

TAS 250 may receive answer signal 420. In response, TAS 250 may output a call info: line busy signal 430 (e.g., a signal indicating that a conceptual telephone line, associated with user devices 110-1 and 110-2, is in an active call state) to user device 110-2. As mentioned above, in situations where more than two user devices 110 are associated with the telephone number or subscriber, line busy signal 430 may be provided to the additional user devices 110 as well. In some implementations, line busy signal 430 may also be provided to user device 110-1. Line busy signal 430 may include information regarding user device 110-1, such as information included in, or otherwise determined based on, answer signal 420. In one implementation, line busy signal 430 may include an identifier of user device 110-1 (e.g., IP address, MAC address, etc.) and a timestamp from answer 420. In another implementation, line busy signal 430 may include an identifier of user device 110-1 without a timestamp.

User device 110-2 may receive line busy signal 430 and may store log information 435, which may include the identifier of the answering user device 110-1 and the timestamp of when user device 110-1 answered the call. Alternatively, user device 110-2 may store the identifier of the answering user device 110-1 and another timestamp, such as a time when user device 110-2 received line busy signal 430, a time when TAS 250 received answer 420, or a time at which line busy signal 430 was sent by TAS 250.

Still referring to FIG. 4, assume that user device 110-1 initiates a transfer signal 440 indicating that the call should be transferred (e.g., to user device 110-2). User device 110-1 may store log information 445, indicating that the call was transferred. Transfer signal 440 may be received by TAS 250 and cause TAS 250 to send a transfer notification 450 to user device 110-2 indicating that the call is being transferred. User device 110-2 may accept the call and send a pick up notification 455 (e.g., a SIP 200 OK) to TAS 250, indicating that user device 110-2 has been used to pick up the transferred call.

In conjunction with pick up notification 455, user device 110-2 may store log information 458, which may include a timestamp of when user device 110-2 picked up the transferred call.

TAS 250 may receive pick up notification 455. In response, TAS 250 may output a call info: line busy signal 460 (e.g., a signal indicating that the conceptual telephone line, associated with user devices 110-1 and 110-2, remains in an active call state) to user device 110-1 (and other user devices 110 in device group 115, if any). Line busy signal 460 may include information regarding user device 110-2, such as information included in, or otherwise determined based on, pick up notification 455. In one implementation, line busy signal 460 may include an identifier of user device 110-2 (e.g., IP address, MAC address, etc.) and a timestamp from pick up notification 455.

User device 110-1 may receive line busy signal 430 and may store log information 465, which may include the identifier of the transferred user device 110-2 and the timestamp of when user device 110-2 picked up the call or another timestamp. In another implementation, line busy signal 460 and storing log information 465 may be omitted.

Upon completion of the call, user device 110-2 may output a hang up notification 470 to TAS 250. Hang up notification 470 may include an ending timestamp, among other information. In response to the call ending, user device 110-2 may generate a log entry 475, based on information from stored log info 415, stored log info 435, and stored log info 458. Similar to unified call log entry 150 described above, log entry 475 may include, for example, the telephone number from which the call was received (e.g., from stored log info 415), the identifier of a device that first answered the call (e.g., from stored log info 435), information regarding the location at which the call originated (e.g., from stored log info 415), a tag associated with the call (stored log info 415), a time at which the call was answered (e.g., from stored log info 435), a duration of the call (e.g., derived from timestamps in stored log info 435 and stored log info 458), and times at which the call was transferred to and/or picked up by user device 110-2 (e.g., from stored log info 458).

TAS 250 may receive hang up notification 470. In response, TAS 250 may output a call info: line idle signal 480 (e.g., a signal indicating that the conceptual telephone line, associated with user devices 110-1 and 110-2, changed to an idle state) to user device 110-1 (and other user devices 110 in device group 115, if any). Line idle signal 480 may include information regarding user device 110-2, such as information included in, or otherwise determined based on, hang up notification 475. In one implementation, line idle signal 480 may include the identifier of user device 110-2 and a timestamp from hang up notification 475.

User device 110-1 may receive line idle signal 480 and, in response, may generate a log entry 485, based on information from stored log info 410, stored log info 425, stored log info 445, and stored log info 465. Similar to unified call log entry 475 described above, log entry 485 may include, for example, the telephone number from which the call was received (e.g., from stored log info 410), the identifier of a device that first answered the call (e.g., from stored log info 425), information regarding the location at which the call originated (e.g., from stored log info 410), a tag associated with the call (e.g., from stored log info 410), a time at which the call was answered (e.g., from stored log info 425), a duration of the call (e.g., derived from timestamps in stored log info 425 and stored log info 465), and times at which the call was transferred to and/or picked up by user device 110-2 (e.g., from stored log info 445 and/or stored log info 465). Although log entry 475 and log entry 485 may be derived from different locally stored data (e.g., stored on user devices 110-1 and 110-2, respectively), log entry 475 and log entry 485 may be identical (e.g., if locally-stored contact databases have been synchronized and the relevant timestamps are the same) or substantially similar (e.g., if contact databases are not identical and timestamp variations exist).

Referring to FIG. 5, some signals in FIG. 5 may be similar or identical to signals in FIG. 4. For the sake of brevity, these similar or identical signals may not be described in detail.

In FIG. 5, TAS 250 may output an invite signal 505 (e.g., similar to invite signal 405 described above) to user devices 110-1 and 110-2 to indicate an incoming call for the telephone number or subscriber. Each of user devices 110-1 and 110-2 may store log information obtained and/or derived from invite signal 505. User device 110-1 may store the caller's user name and telephone number as log information 510, and user device 110-2 may store log information 515.

Assume that user device 110-1 is used to answer the call while connected to RAN 240 via access point 140. User device 110-1 may output an answer signal 520. In conjunction with answer signal 520, user device 110-1 may store log information 525, which may include a timestamp of when user device 110-1 answered the call.

TAS 250 may receive answer signal 520. In response, TAS 250 may output a call info: line busy signal 530 to user device 110-2. Line busy signal 530 may include information regarding user device 110-1, such as information included in, or otherwise determined based on, answer signal 520.

User device 110-2 may receive line busy signal 530 and may store log information 535, which may include the identifier of the answering user device 110-1 and a timestamp (e.g., of a time when user device 110-1 answered the call, a time when user device 110-2 received line busy signal 530, a time when TAS 250 received answer 520, or a time at which line busy signal 530 was sent by TAS 250).

Assume that user device 110-1 leaves the coverage area of WLAN 240 and provides handover exchange information 540 indicating that the call should continue using RAN 230 via wireless station 130. User device 110-1 may store log information 545, indicating that a call handover from WLAN 240 to RAN 230.

Handover exchange information 540 may be received by TAS 250. The change in access networks from WLAN 240 to RAN 230 may cause the TAS 250 to identify the end of one call via WLAN 240 and the start of a new call over RAN 230. Thus, TAS 250 may send a call information message 550 to user device 110-2 indicating that the a call on one line (e.g., a conceptual telephone line, associated with device group 115) using WLAN 240 is in an idle state and that a call on another line (e.g., a different conceptual telephone line, associated with device group 115) using RAN 130 is in an active call state. User device 110-2 may receive call information message 550, determine that a call handover (H/O) has occurred, and may store the information as log information 555. In one implementation, handover detection may be determined using different call notification signals from TAS 250 to user devices 110 in device group 115.

Upon completion of the call, user device 110-1 may output a hang up notification 560 to TAS 250. Hang up notification 560 may include an ending timestamp, among other information. According to implementations described herein, the client application on user device 110-1 may detect call continuity during the handover and treat calls over two different access networks as a single log entry. Thus, in response to the call ending, user device 110-1 may generate a log entry 565, based on information from stored log info 510, stored log info 525, and stored log info 545. Log entry 565 may include, for example, the telephone number from which the call was received (e.g., from stored log info 510), the identifier of which device answered the call (e.g., from stored log info 525), a time at which the call was answered (e.g., from stored log info 525), a duration of the call (e.g., derived from timestamps in stored log info 525 and hang up signal 560), and times at which the call was handed over from WLAN 240 to RAN 230 (e.g., from stored log info 545).

TAS 250 may receive hang up notification 560. In response, TAS 250 may output a call info: line idle signal 570 (e.g., a signal indicating that the conceptual telephone line 2, associated with user devices 110-1 and 110-2, changed to an idle state) to user device 110-2 (and other user devices 110 in device group 115, if any). Line idle signal 570 may include information regarding user device 110-1, such as information included in, or otherwise determined based on, hang up notification 560. In one implementation, line idle signal 570 may include the identifier of user device 110-1 and a timestamp from hang up notification 560.

User device 110-2 may receive line idle signal 570 and, in response, may generate a log entry 575. According to implementations described herein, the client application on user device 110-2 may detect call continuity during the handover and treat consecutively-active lines over different access networks as a single log entry. Thus, in response to the call ending, user device 110-2 may generate log entry 575, based on information from stored log info 515, stored log info 535, stored log info 555, and line idle signal 570. Although log entry 565 and log entry 575 may be derived from different locally stored data (e.g., stored on user devices 110-1 and 110-2, respectively), log entry 565 and log entry 575 may be identical (e.g., if locally-stored contact databases have been synchronized and the relevant timestamps are the same) or substantially similar (e.g., if contact databases are not identical or timestamp variations exist).

Although FIGS. 4 and 5 show exemplary signals of signal flows for generating unified call logs, in other implementations, signal flows may include fewer signals, different signals, differently-arranged signals, or additional signals than depicted in FIGS. 4 and 5. Furthermore, some signals in FIGS. 4 and 5 may be combined in a single call.

Figure 6:
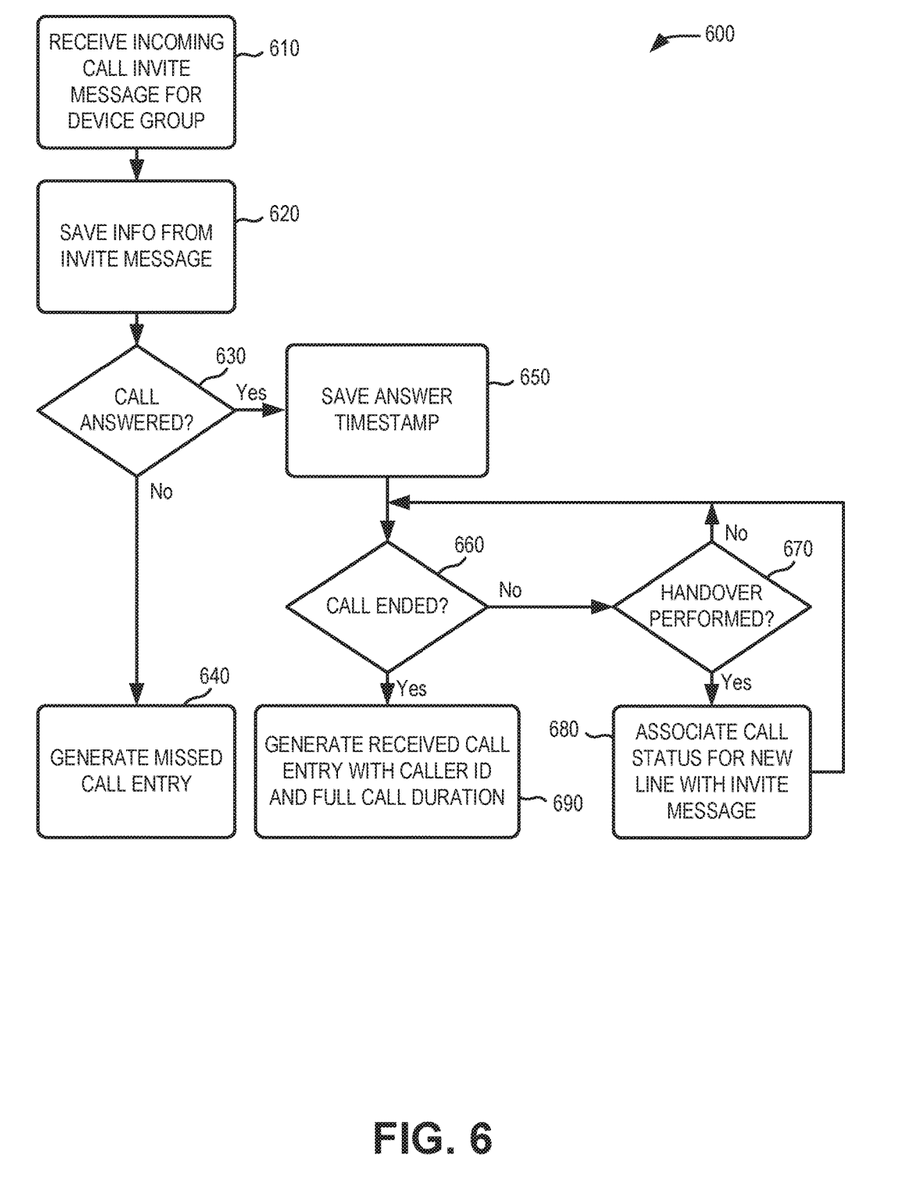
FIG. 6 is a flowchart of an exemplary process for providing synchronized call information for an inbound call, according to an implementation described herein.

FIG. 6 is a flow diagram illustrating an exemplary process 600 for providing synchronized call information for an inbound call. In one implementation, process 600 may be performed by user device 110. In another implementation, some or all of process 600 may be performed by user device 110 in conjunction with another device or group of devices in network environment 200. Descriptions of process 600 may refer to example signals described in connection with FIGS. 4 and 5. However, process 600 is not limited to these examples.

Process 600 may include receiving an incoming call invite message for a device group (block 610), and saving call information from the invite message (block 620). For example, user device 110 may receive a call invite message (e.g., invite message 505) for device group 115. Each user device 110 in device group 115 may identify and save information from the call invite, such as originating caller information CallerID (e.g., calling telephone number), a received timestamp (e.g., Timestamp1, the time the call invite was received), a line index parameter (appearance index, indicating the number of forwarding hops for a call), and line universal resource indicator (e.g., appearance URI, indicating the URI of the most recent hop).

Process 600 may also include determining if the call was answered (block 630). For example, if one of the user devices 110 in device group 115 (e.g., user device 110-1) answers the incoming call, answer signal 520 (e.g., a SIP 200 OK message) may indicate the call has been answered. Additionally, non-answering user devices (e.g., user device 110-2) may receive line busy signal 530 (e.g., from TAS 250) that indicates the call has been answered by another device in device group 115. Alternatively, user devices 110 may determine the call was not answered when an answer signal 520 or line busy signal 530 is not detected within a timeout period.

If the call was not answered (block 630—No), process 600 may include generating a missed call entry (block 640). For example, user device 110 may generate a call log entry indicating the caller ID and timestamp as determined from the incoming call invite message (e.g., as stored in log info 505 or 515).

If the call was answered (block 630—Yes), process 600 may include saving an answer timestamp (block 650). For example, user device 110-1 may save the timestamp from answer signal 520 or user device 110-2 may save the timestamp from line busy signal 530.

Process 600 may further include determining if the call has ended (block 660). For example, user device 110 may generate a message (e.g., hang up notification 470/560) when a user ends a call. Alternatively, user devices 110 in device group 115 may receive a line idle signal (e.g., line idle signal 480) from TAS 250 when a call on a particular line is ended. If neither of a hang up notification or line idle signal is received (and/or periodic line active updates are provided), user devices 110 in device group 115 may determine a line is not idle.

If the call has not ended (block 660—No), process 600 may include determining if a handover has been performed (block 670). For example, user devices 110 may receive call information 550 from TAS 250 indicating that a previously active line (e.g., a conceptual telephone line, associated with device group 115) is now idle. Call information 550 may also include information about initiation of another active line between the same two devices in close time proximity. User devices 110 in device group 115 may use call information 550 to determine if a handover has occurred.

If a handover has been performed (block 670—Yes), process 600 may include associating call status for a new line with the invite message (block 680). For example, user devices 110 may receive call information 550 from TAS 250 indicating that the a call on one line (e.g., a conceptual telephone line, associated with device group 115) using one access network (e.g., WLAN 240) is in an idle state and that a new call on another line using a different access network (e.g., between the same user devices) is in an active call state. User device 110-2 may receive call information 550, determine that a call handover (H/O) has occurred, and may store the information as log information 555.

If a handover has not been performed (block 670—NO) or after saving new line index information in block 680, process 600 may return to block 660 to determine if a call has ended.

If the call has ended (block 660—Yes), process 600 may include generating a received call entry with a caller identifier and a full call duration (block 690). For example, when a call has ended, user device 110 may generate a received call log entry (e.g., log entry 565 or 575) that includes the caller ID from the original invite message (e.g., invite message 505) and a call duration calculated from the answer timestamp (e.g., stored log info 525 or log info 535) for the first line and a timestamp of the hang up message (e.g., hang up notification 560) or call information (line idle signal 570).

Figure 7:
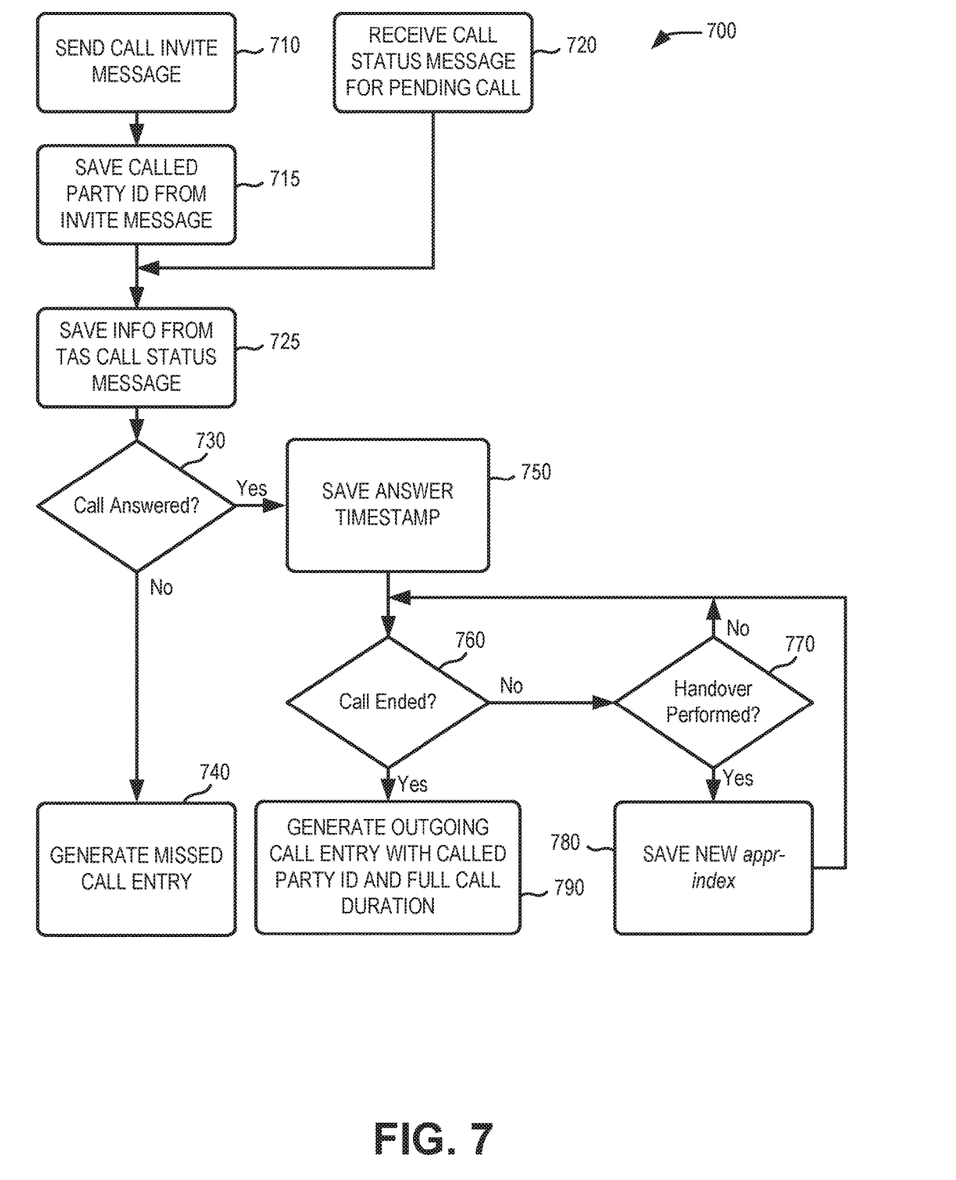
FIG. 7 is a flowchart of an exemplary process for providing synchronized call information for an outbound call, according to an implementation described herein.

FIG. 7 is a flow diagram illustrating an exemplary process 700 for providing synchronized call information for an outbound call. In one implementation, process 700 may be performed by user device 110. In another implementation, some or all of process 700 may be performed by user device 110 in conjunction with another device or group of devices in network environment 200.

Process 700 may include sending call invite message from a user device in a device group (block 710), and saving the called party identifier (block 715). For example, a user device 110 placing a call from a line associated with device group 115 may send a call invite message to TAS 250. User device 110 may store the called party identifier from the call.

Process 700 may also include receiving a call status message for a pending call (block 720), and saving call information from the call status message (block 725). For example, in response to the call invite message from the calling user device 110, all user devices 110 in device group 115 may receive a call status message from TAS 250 indicating a pending call (e.g., appr-state=progressing). The TAS call status message may include a caller ID, a called party ID, and a call index that may be stored by user device 110.

Process 700 may also include determining if the call was answered (block 730). For example, if another device answers the outgoing call, the calling user device 110 may receive an acknowledgement (e.g., SIP 200 OK) or other user devices 110 may receive a line busy signal (e g, similar to line busy signal 530) from TAS 250 that indicates the call has been answered. Alternatively, user devices 110 may determine the call was not answered when a line busy signal is not detected within a timeout period.

If the call was not answered (block 730—No), process 700 may include generating a missed call entry (block 740). For example, user device 110 may generate a call log entry indicating the called party ID and timestamp as determined from the outgoing call invite message or the initial TAS call status message.

If the call was answered (block 730—Yes), process 700 may include saving an answer timestamp (block 750). For example, the calling user device 110 may save the timestamp from acknowledgement signal or the other user devices may save the timestamp from the line busy signal.

Process 700 may further include determining if the call has ended (block 760). For example, user device 110 may generate a message (e.g., hang up notification 470/560) when a user ends a call. Alternatively, user devices 110 in device group 115 may receive a line idle signal (e.g., similar to line idle signal 480) from TAS 250 when a call on a particular line is ended. If neither of a hang up notification or line idle signal is received (and/or periodic line active updates are provided), user devices 110 in device group 115 may determine a line is not idle.

If the call has not ended (block 760—No), process 700 may include determining if a handover has been performed (block 770). For example, user devices 110 may receive call status information from TAS 250 indicating that a previously active line (e.g., a conceptual telephone line, associated with device group 115) is now idle. The call status information may also include information about initiation of another active line between the same two devices in close time proximity. User devices 110 in device group 115 may use the call status information to determine if a handover has occurred.

If a handover has been performed (block 770—Yes), process 700 may include saving new line index information (block 780). For example, user devices 110 may receive call status information from TAS 250 indicating that the call on one line using one access network (e.g., WLAN 240) is in an idle state and that a new call on another line using a different access network (e.g., between the same user devices) is in an active call state. User devices 110 may receive the call status information, determine that a call handover (H/O) has occurred, and store the new line information associated with the initial called party ID.

If a handover has not been performed (block 770—NO) or after saving new line index information in block 780, process 700 may return to block 760 to determine if a call has ended.

If the call has ended (block 760—Yes), process 700 may include generating an outgoing call entry with a called party identifier and a full call duration (block 790). For example, when a call has ended, user device 110 may generate an outgoing call log entry that includes the called party ID, from the original invite message or call status message, and a call duration. The call duration may be calculated from the answer timestamp for the first line and a timestamp of the hang up message or the idle line status message.

Systems and methods provide a unified call log for user devices in a device group for a telephony service that simultaneously notifies both the user device and the other user device of an incoming call. According to one implementation a user device receives an invite message that identifies an incoming call and provides a caller telephone number, and stores first call log information including a caller identifier based on the invite message. The user device receives a status message indicating that another user device has answered the incoming call and stores second call log information including a timestamp for the status message. The user device receives a call information message for a new line between the user device and a device associated with the caller telephone number; determines, based on the call information message, that the new line is a handover call associated with the incoming call; and stores third call log information for the new line. The user device determines that the handover call on the new line is ended and generates a call log entry for the user device that indicates the other user device answered the incoming call and a combined duration of the incoming call and the handover call.

The system and methods allow user devices in a device group to each separately generate a unified call log in a distributed manner, without the need for a call log server. Each user device may use separate communications, such as an invite message, status messages, and call transfer notifications to compile and/or derive call log information that is consistent (or substantially consistent, as described above) among all user devices in a devices group. The systems and methods also allow user devices to detect network handovers for call continuity and associate handovers within a single call log entry.

As set forth in this description and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

The foregoing description of embodiments provides illustration, but is not intended to be exhaustive or to limit the embodiments to the precise form disclosed. Accordingly, modifications to the embodiments described herein may be possible. For example, various modifications and changes may be made thereto, and additional embodiments may be implemented, without departing from the broader scope of the invention as set forth in the claims that follow. The description and drawings are accordingly to be regarded as illustrative rather than restrictive.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The word "exemplary" is used herein to mean "serving as an example." Any embodiment or implementation described as "exemplary" is not necessarily to be construed as preferred or advantageous over other embodiments or implementations.

In addition, while a series of signals or blocks has been described with regard to the processes illustrated in FIGS. 4-7, the order of the signal or blocks may be modified according to other embodiments. Further, non-dependent signals or blocks may be performed in parallel. Additionally, other processes described in this description may be modified and/or non-dependent operations may be performed in parallel.

The embodiments described herein may be implemented in many different forms of software executed by hardware. For example, a process or a function may be implemented as "logic," a "component," or an "element." The logic, the component, or the element, may include, for example, hardware (such as a processor, an ASIC, or a FPGA) or a combination of hardware and software. The embodiments have been described without reference to the specific software code since the software code can be designed to implement the embodiments based on the description herein and commercially available software design environments and/or languages.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

To the extent the aforementioned embodiments collect, store, or employ personal information of individuals, it should be understood that such information shall be collected, stored, and used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Collection, storage and use of personal information can be in an appropriately secure manner reflective of the type of information, for example, through various encryption and anonymization techniques for particularly sensitive information.

No element, act, or instruction used in the present application should be construed as critical or essential to the invention unless explicitly described as such.

What is claimed is:

1. A user device, comprising:
an interface that communicates with a network;
a memory configured to store instructions and call log data; and
a processor, coupled to the interface and the memory, wherein the processor is configured to execute the instructions stored in the memory to:
receive an invite message identifying an incoming call and providing a caller telephone number;
store, in the memory, first call log information including a caller identifier based on the invite message;
receive a status message indicating that another user device has answered the incoming call;
store, in the memory, second call log information including a timestamp for the status message;
receive a call information message for a new line between the user device and a device associated with the caller telephone number;
determine, based on the call information message, that the new line is a handover call associated with the incoming call;
store, in the memory, third call log information for the new line;
receive a call transfer notification, wherein the call transfer notification solicits a transfer of the call from the other user device to the user device;
accept the transferred call;
store, in the memory, fourth call log information including a timestamp for accepting the transferred call;
determine that the transferred call is ended; and
generate, after determining the call is ended, a call log entry for the user device that indicates the other user device answered the incoming call, the user device answered the transferred call, and a combined duration of the incoming call, the handover call, and the transferred call.

2. The user device of claim 1, wherein the call log entry is derived from the first call log information, the second call log information, the third call log information, and the fourth call log information.

3. The user device of claim 1, wherein the processor is further configured to:
store, in the memory, the call log entry.

4. The user device of claim 1, wherein the user device and the other user device are associated in a device group for a telephony service that simultaneously notifies both the user device and the other user device of incoming calls.

5. The user device of claim 1, wherein the processor is further configured to:
present the call log entry to a user of the user device.

6. The user device of claim 1, wherein, when storing the first call log information, the processor is further configured to:
match the caller telephone number with a number stored in a locally-stored contacts database; and
extract a user name from an entry in the locally-stored contacts database that includes the matching number.

7. The user device of claim 1, wherein, when generating the call log entry, the processor is further configured to:
calculate the duration of the call, the handover call, and the transferred call from the timestamp in the second call log, the timestamp in the fourth call log, and a time the user device determines that the transferred call is ended.

8. The user device of claim 1, wherein, when receiving the status message indicating that another user device has answered the incoming call, the processor is further configured to:
identify a line status as active in a message from a telephony application server (TAS) device.

9. The user device of claim 1, wherein the invite message includes a session initiation protocol (SIP) invite.

10. The user device of claim 1, wherein the processor is further configured to:
store, in the memory, the first call log information including a timestamp for the invite message, and
wherein, when generating the call log entry, the processor is further configured to indicate, based on the first call log information, a time that the other user device received the incoming call.

11. A method, comprising:
receiving, by a user device, an invite message that identifies an incoming call and provides a caller telephone number;
storing, by the user device and in a local memory, first call log information including a caller identifier based on the invite message;
receiving, by the user device, a status message indicating that another user device has answered the incoming call;
storing, by the user device and in the local memory, second call log information including a timestamp for the status message;
receiving, by the user device, a call information message for a new line between the user device and a device associated with the caller telephone number;
determining, by the user device and based on the call information message, that the new line is a handover call associated with the incoming call;
storing, by the user device and in the memory, third call log information for the new line;
receiving a call transfer notification, wherein the call transfer notification solicits a transfer of the call from the other user device to the user device;
accepting the transferred call;
storing, by the user device and in the memory, fourth call log information including a timestamp for accepting the transferred call;
determining, by the user device, that the transferred call is ended; and
generating, by the user device and after determining the call is ended, a call log entry for the user device that indicates the other user device answered the incoming call, the user device answered the transferred call, and a combined duration of the incoming call, the handover call, and the transferred call.

12. The method of claim 11, wherein, when generating the call log entry, the user device derives the call log entry from the first call log information, the second call log information, the third call log information, and the fourth call log information.

13. The method of claim 11, wherein the invite message, the status message, and the call information message are received by the user device as separate communications.

14. The method of claim 11, further comprising:
storing, in the local memory, the call log entry.

15. The method of claim 11, further comprising:
presenting the call log entry to a user of the user device.

16. The method of claim 11, further comprising:
wherein the user device and the other user device are associated in a device group for a telephony service that simultaneously notifies both the user device and the other user device of incoming calls.

17. The method of claim 11 wherein receiving the status message indicating that another user device has answered the incoming call further comprises:
identifying a line status as active in a message from a telephony application server (TAS) device.

18. A non-transitory computer-readable medium containing instructions executable by at least one processor, the computer-readable medium comprising one or more instructions to:
receive an invite message identifying an incoming call and providing a caller telephone number;
store, in a memory, first call log information including a caller identifier based on the invite message;
receive a status message indicating that another user device has answered the incoming call;
store, in the memory, second call log information including a timestamp for the status message;
receive a call information message for a new line between the user device and a device associated with the caller telephone number;
determine, based on the call information message, that the new line is a handover call associated with the incoming call;
store, in the memory, third call log information for the new line;
receive a call transfer notification, wherein the call transfer notification solicits a transfer of the call from the other user device to the user device;
accept the transferred call;
store, in the memory, fourth call log information including a timestamp for accepting the transferred call;
determine that the transferred call is ended; and
generate, after determining the call is ended, a call log entry for the user device that indicates the other user device answered the incoming call, the user device answered the transferred call, and a combined duration of the incoming call, the handover call, and the transferred call.

19. The non-transitory computer-readable medium of claim 18, wherein the user device and the other user device are associated in a device group for a telephony service that simultaneously notifies both the user device and the other user device of incoming calls.

20. The non-transitory computer-readable medium of claim 19, further comprising instructions to:
store, in the memory, the call log entry; and
present the call log entry to a user of the user device.

* * * * *